US005770138A

United States Patent [19]
Yoder

[11] Patent Number: 5,770,138
[45] Date of Patent: Jun. 23, 1998

[54] METHOD OF MAKING ENHANCED NON-CLAY GRANULES MADE FROM PULP OR PAPER SLUDGE

[75] Inventor: Rick L. Yoder, Green Bay, Wis.

[73] Assignee: Thermo Fibergen, Inc., Waltham, Mass.

[21] Appl. No.: 410,150

[22] Filed: Mar. 24, 1995

[51] Int. Cl.$^6$ ................................................. B29C 67/02
[52] U.S. Cl. ........................... 264/117; 264/122; 119/172
[58] Field of Search .................................. 264/109, 117, 264/122; 23/313 R; 119/171, 172, 173

[56] References Cited

U.S. PATENT DOCUMENTS

| | | | |
|---|---|---|---|
| 4,560,527 | 12/1985 | Harke et al. ............................. | 264/117 |
| 4,721,059 | 1/1988 | Lowe et al. ............................. | 119/172 |
| 4,734,393 | 3/1988 | Lowe et al. ............................. | 502/404 |
| 5,019,564 | 5/1991 | Lowe et al. ............................. | 514/75 |

*Primary Examiner*—James Engel
*Assistant Examiner*—Kenneth M. Jones
*Attorney, Agent, or Firm*—Laff, Whitesel, Conte & Saret, Ltd.

[57] ABSTRACT

An improved granule product derived from pulp or paper sludge or other fibrous plant materials prepared by adjusting the moisture content of raw pulp or paper sludge, reducing the fiber size of the sludge, agitating the sludge to cause cellulosic fibers to interlock and bond to form granules, tumbling the granules in a rolling device and then drying the granules.

21 Claims, 1 Drawing Sheet

METHOD OF MAKING ENHANCED NON-CLAY GRANULES MADE FROM PULP OR PAPER SLUDGE

FIELD OF THE INVENTION

This invention relates generally to granules made from cellulosic fibers and, more particularly, to improved granules made from pulp or paper sludge or other fibrous plant materials such as sugar beet, sugar cane, citrus pulp, grain, potato, peat moss and composted organic materials.

BACKGROUND OF THE INVENTION

Pulp and paper manufacturing operations produce a substantial flow of waste water. The solid material which is filtered out of the waste water, called "sludge," is expensive to dispose of because it must be either burned or buried in landfill operations.

Various techniques for minimizing the sludge disposal problem and putting such sludge to practical use have been suggested. For example, U.S. Pat. No. 5,019,564, assigned to Edward Lowe Industries, Inc., describes a non-clay agricultural carrier granule created from fibers derived from pulp or paper sludge which can be used as a pesticide or fertilizer carrier or diluent. U.S. Pat. No. 4,734,393, also assigned to Edward Lowe Industries, Inc., describes a granule absorbent for the collection and control of oil and grease similarly formed preferably from fibers derived from pulp or paper sludge. U.S. Pat. No. 4,721,059, also assigned to Edward Lowe Industries, Inc., discloses a catbox filler derived from pulp or paper sludge.

Granules derived from pulp or paper sludge for application as agricultural granules, oil and grease adsorbents, catbox fillers, etc., must be free-flowing and should be of generally uniform bulk density. Unfortunately, under certain conditions, the granules formed from pulp or paper sludge will have fibers protruding from their surface.

The protruding fibers can cause the granules to stick together and therefore prevent them from flowing freely. They also can create air pockets which make for non-uniform bulk density. Finally, these protruding fibers can decrease the liquid holding capacity or absorbency of the granules because some of the liquid which is intended to be absorbed by the granules instead adheres to the protruding fibers.

It is therefore an object of the present invention to provide granules made from pulp or paper sludge which have improved granular shape and little or no protruding fibers.

It is another object of the present invention to provide granules made from pulp or paper sludge which are free-flowing and of generally uniform bulk density.

It is yet another object of the present invention to provide granules made from pulp or paper sludge which increase the liquid holding capacity of the granules.

SUMMARY OF THE INVENTION

The method of the invention calls for providing raw pulp or paper sludge, adjusting its moisture content, reducing fiber size, agitating in an appropriate device to cause the cellulosic fibers present in the pulp or paper sludge to interlock and bond to form granules, tumbling the granules in a rolling device separate from the agitating device and then drying the granules.

The resulting granules will exhibit improved granular shape and generally uniform bulk density, a minimization of protruding fibers, enhanced flow properties and increased liquid holding capacity.

DETAILED DESCRIPTION OF THE INVENTION

Figure 1:
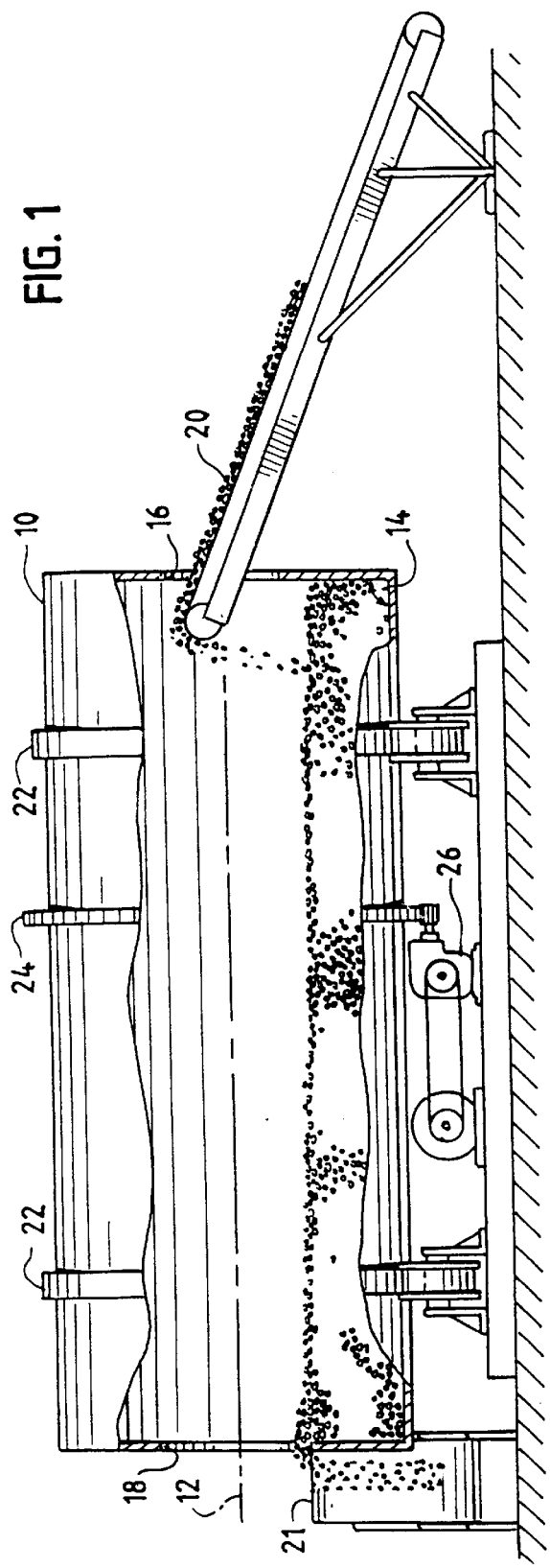
FIG. 1 is a side elevation view of the rolling device.

The starting material in the formation of the non-clay granules of this invention is pulp or paper sludge, although other fibrous plant materials such as sugar beet, sugar cane, citrus pulp, grain, potato, peat moss and composted organic materials may be utilized. The starting material may also contain up to about 20% extraneous matter, such as synthetic fibers, shredded plastics and ink residues. The above materials, including pulp or paper sludge, may be used either individually or in any combination of two or more thereof. In pulp and paper operations, there is a substantial flow of excess water or effluent which carries with it such things as rejects from pulp cleaning, excess pulping liquor, materials extracted from pulp during bleaching, and excess clay and filler. Because a large proportion of the waste is organic material extracted from wood, the biological oxygen demand or "BOD" of the effluent is high and it must be disposed of as safely as possible.

The basic types of pulp or paper sludge which may be used in the practice of this invention are any primary pulp or paper sludge generated by a sulfate, sulfite, de-inked, mechanical or semi-chemical pulping process either alone or in combination with a secondary sludge generated by a sulfate, sulfite, de-inked, mechanical or semi-chemical pulping process. One preferred sludge is primary de-inked sludge. Primary de-inked sludge is the waste material produced from paper mills which use waste paper both pre- and post-consumer, newsprint and other papers as feed stock. The sludge has a content of about 40%–90% fiber and 10%–60% filler (e.g. kaolin, barytes, calcium carbonate, titanium dioxide, other plant fibers, etc.).

De-inked paper sludge in its raw form is approximately 90% water. It should be analyzed for composition and bacteria and then dewatered by any accepted method (usually pressing or centrifuging) to approximately 40%–50% solids. Dewatering to 45% solids is preferred. The paper sludge is next broken down to make it a consistent size. The moisture level is adjusted, if necessary, by heating, for example in a conventional fluid bed dryer. The paper sludge is then shredded by any conventional method (e.g. high-speed intensive mixer, reduction mill or shredder) to a fiber length of about 1–10 mm. Preferred equipment for this purpose includes a Turbulizer made by Bepex of Minneapolis, Minn. The preferred fiber length is about 1–4 mm.

In accordance with the techniques described in U.S. Pat. Nos. 5,109,564; 4,734,393 and 4,721,059, the disclosures of which are incorporated by reference, the dewatered fiber undergoes a quality adjustment, if required. This quality adjustment may involve the addition of additives such as dye, titanium dioxide or barytes to adjust color; a biocide or slimacide to control bacterial and fungal growth; kaolin clay or barytes to increase density; and, a fragrance to counteract odors.

The biocide or slimacide is generally formed from one of the following: quaternary ammonium salts, aldehyde derivatives, halogenated styrenes, thiocyanates, carbamates, azo chlorides, and modified phenols. Halogenated styrenes and thiocyanates are preferred. More specifically, a mixture of bromonitrostyrene and methylene bisthiocyanate such as Slime-Trol® RX-41 sold by Betz Paperchem, Inc. is most preferred.

Agricultural chemicals, may also be incorporated into the sludge mixture before drying. The agricultural chemicals generally include pesticides and fertilizers. The pesticides also include biological crop protection agents, such as bacillus thuringiensis. Any agricultural chemical added before drying must be able to retain its efficacy after being subjected to the heat associated with drying.

After the quality adjustment, the sludge mixture is agglomerated or granulated by agitating the mixture with added water in an agglomeration device such as a drum pelletizer, disk pelletizer, pinmill, or granulator. The use of a pinmill is preferred. The fiber content of the solids in the mixture should exceed at least 10%–15% by weight and will preferably be as high as possible, with mineral fillers constituting the remainder.

During agitation, the fibers begin to interlock and bond together to form the granules, the size of which is determined by the water/solids ratio, the time elapsed in the agglomeration process, and the fiber/filler ratio. The sludge and slurry mixture is formed into spherical pellets or, preferably, granular shapes.

The granules are next tumbled for a period of time ("residence time") in a separate tumbling device. The preferred residence time in the tumbling device is in the range of about 1 to 60 minutes, with a residence time of about 15 to 20 minutes being more preferred. The tumbling action produces enhanced granule-against-granule interaction, which is believed to decrease or eliminate undesirable protruding fibers. It may be desirable to add water at a rate sufficient to increase the moisture level of the incoming granules by up to about 3% to enhance the flowability of the final product. It is preferred that the moisture level of the incoming granules be increased by approximately 1.5%.

Figure 2:
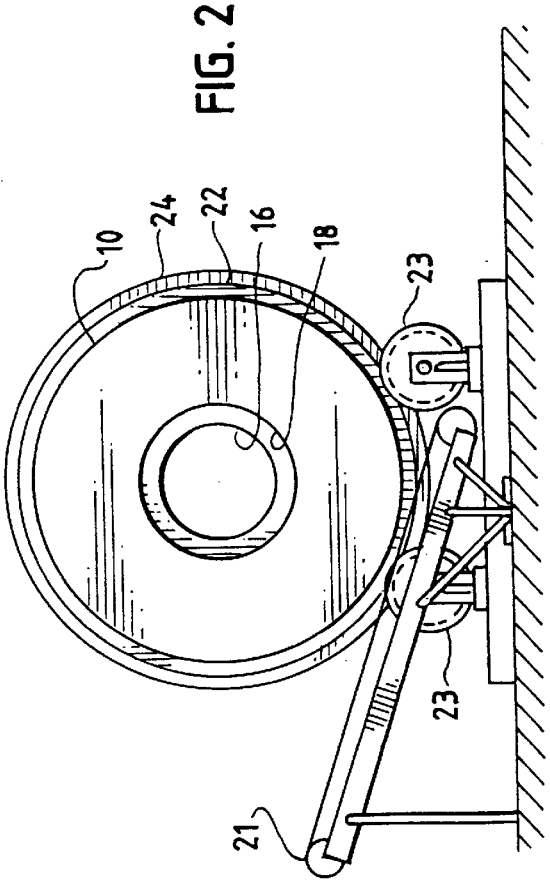
FIG. 2 is an end elevation view of the rolling device.

As shown in FIGS. 1 and 2, the tumbling action may be achieved using a generally horizontal tube or rolling device 10 which rotates about its longitudinal axis 12 and is positioned at a slight angle 14 of about 1°–5° to facilitate the flow of the granules 20 onto the discharge belt 21. Positioning at an angle of about 1.5° is preferred. The angle 14 can be either an incline or a decline from inlet 16 to outlet 18, with a decline being preferred. The rolling device 10 is held by two roller trunnions 22 and two support trunnions 23 and rotated by a circular gear 24 driven by a gear box 26. Generally, the rolling device 10 operates at a speed in the range of about 90 to 250 ft/min. More preferably, the rolling device 10 operates at a speed in the range of about 150 to 220 ft/min, with a speed of about 188 ft/min being most preferred.

The diameter and length of the rolling device 10 are dependent upon the scale of operation and the type of sludge used. For example, a rolling device 10 for use in a pilot plant could be about 36–48 inches in diameter and about 4–6 feet long. Similarly, a rolling device 10 for use in a commercial operation could be about 8–12 feet in diameter and about 30–45 feet long. It is preferred that the rolling device have a generally smooth inner surface.

The resulting rolled product is dried until the granule contains 1%–10% moisture by weight. Drying is accomplished in any standard dryer such as a fluid bed dryer, turbo dryer, belt dryer or tray dryer at a temperature range of 200°–750° F. After drying, color, fragrance and/or, an agricultural chemical, such as a pesticide, fertilizer or biological crop protection agent, may be added. The product may then be packaged for later use as an agricultural carrier, an oil and grease absorbent, an animal litter, or for other uses.

EXAMPLE

The following example is intended to be illustrative of the present invention and to teach one of ordinary skill how to make and use the invention. This example is not intended to limit the invention or its protection in any way.

In this example, pilot plant runs were conducted. Each run consisted of two operational modes: (1) pilot plant without the rolling device (referred to as "normal mode") and (2) pilot plant with the rolling device (referred to as "roller mode"). Sludge was utilized and all of the runs were conducted to maximize granule formation regardless of where the bulk densities and size distributions fell. Each run lasted approximately 2.5 hours, the first hour being used to line the system out. Three sets of samples were taken from the dryer at one-half hour intervals and tested for bulk density and angle of repose. The three samples were then combined and split for screen analysis. This procedure was repeated almost every weekday for approximately six weeks and the results were averaged daily.

The rolling device was approximately 42 inches in diameter and about 5 feet long with a generally smooth inner surface. The rolling device was operated at ambient temperature at a speed of about 188 ft/min for a residence time of about 15 minutes and water was added at a rate of approximately 0.8 gal/min to increase the moisture level of the incoming granules by 1.5%. The speed of the rolling device and the rate of water addition remained constant throughout the duration of the runs. The rolling device was positioned at a slight decline of about 1.5° from inlet to outlet.

As indicated in the tables below, the test results confirmed the effectiveness of the present invention. In addition to reducing the effects of sludge variability on the final product, the overall quality of the granules was enhanced. The granules exhibited improved granular shape and generally uniform density, a minimization of protruding fibers, improved flow properties and increased liquid holding capacity.

As shown below in Tables 1 and 2, the standard deviations of the bulk density and the angle of repose of the final products decreased when the rolling device was used, thereby indicating a reduction in the variability of the granules and an enhancement in their flowability. The bulk density was determined using the loose fill ASTM method and the angle of repose was determined by measuring the flow characteristics of free flowing granular samples from each of the final products. The bulk density and the angle of repose of the final products are shown in mesh sizes of 12/20, 16/30 and 20/40.

TABLE 1

| | BULK DENSITY | |
| --- | --- | --- |
| | 12/20 NORMAL MODE | 12/20 ROLLER MODE |
| MEAN | 35.6 | 41.2 |
| STANDARD DEVIATION | 1.6 | 1.2 |
| RANGE | 32.1–38.4 | 38.7–42.8 |

TABLE 1-continued

BULK DENSITY

|  | 16/30 NORMAL MODE | 16/30 ROLLER MODE |
|---|---|---|
| MEAN | 36.8 | 41.7 |
| STANDARD DEVIATION | 1.9 | 1.2 |
|  | 32.6–39.7 | 40.1–43.9 |

|  | 20/40 NORMAL MODE | 20/40 ROLLER MODE |
|---|---|---|
| MEAN | 37.5 | 42.1 |
| STANDARD DEVIATION | 1.8 | 1.3 |
| RANGE | 33.9–40.2 | 39.3–44.5 |

TABLE 2

ANGLE OF REPOSE

|  | 12/20 NORMAL MODE | 12/20 ROLLER MODE |
|---|---|---|
| MEAN | 35.01 | 32.46 |
| STANDARD DEVIATION | 1.30 | .74 |
| RANGE | 33.14–37.30 | 31.61–33.69 |

|  | 16/30 NORMAL MODE | 16/30 ROLLER MODE |
|---|---|---|
| MEAN | 34.05 | 32.05 |
| STANDARD DEVIATION | 1.27 | .77 |
| RANGE | 32.69–37.30 | 30.65–32.69 |

|  | 20/40 NORMAL MODE | 20/40 ROLLER MODE |
|---|---|---|
| MEAN | 33.70 | 31.66 |
| STANDARD DEVIATION | 1.27 | .73 |
| RANGE | 31.61–36.03 | 30.65–33.14 |

The shape of the granules was determined by a shape analysis system, the Juliet II, made by the Shapesphere Corporation. The procedure used to analyze the shape of the final products consisted of splitting, by use of a sample splitter, composite samples of products from each run. The samples were split down to approximately two hundred granules. The granules were separated, placed on microscopic slides, and then analyzed as separate particle sets.

Table 3 shows the means and standard deviations of the roundness and the classical aspect ratio (CAR) for all of the samples in each product size, as well as the mean standard deviation within each particle set.

$$\text{Roundness is defined as } \frac{\text{radius of inscribed circle}}{\text{radii of all corners and edges}}$$

$$CAR \text{ is defined as } \frac{\text{maximum length}}{\text{minimum length perpendicular to maximum}}$$

As the values of the roundness and CAR approach one, the granules become rounded and more spherical in shape, thereby enhancing flowability. Accordingly, as illustrated in Table 3, the products from the roller mode are much more spherical. Moreover, the standard deviations from day to day, as well as within any given sample, are greatly reduced, again indicating that the use of the rolling device reduces process variability.

One drawback of shape analysis systems is that they are only two-dimensional. Thus, a given particle could be round in two dimensions, but flat in the third. However, visual examination of the granules of the present invention showed them to be spherical.

TABLE 3

SHAPE ANALYSIS

|  | 12/20 NORMAL | | 12/20 ROLLER | |
|---|---|---|---|---|
|  | ROUNDNESS | CAR | ROUNDNESS | CAR |
| Mean For All Runs | 1.78 | 2.01 | 1.29 | 1.66 |
| Std. Deviations For All Runs | .20 | .14 | .05 | .09 |
| Mean Std. Dev. Within A Given Run | 1.16 | 1.25 | .42 | .70 |

|  | 16/30 NORMAL | | 16/30 ROLLER | |
|---|---|---|---|---|
|  | ROUNDNESS | CAR | ROUNDNESS | CAR |
| Mean For All Runs | 1.66 | 2.01 | 1.30 | 1.73 |
| Std. Deviations For All Runs | .21 | .20 | .07 | .14 |
| Mean Std. Dev. Within A Given Run | 1.01 | 1.29 | .45 | .75 |

|  | 20/40 NORMAL | | 20/40 ROLLER | |
|---|---|---|---|---|
|  | ROUNDNESS | CAR | ROUNDNESS | CAR |
| Mean For All Runs | 1.65 | 2.03 | 1.29 | 1.71 |
| Std. Deviations For All Runs | .20 | .27 | .07 | .12 |
| Mean Std. Dev. Within A Given Run | .97 | 1.53 | .41 | .69 |

The extent of fiber protrusion was quantified using a sample splitter to obtain approximately 200 granules per count. The granules were then separated and examined under magnification on microscope slides. The following information was collected: the number of (1) long protruding fibers (fibers equal to or greater than ½ the diameter of the granule), (2) short protruding fibers (fibers that are less than ½ the diameter of the granule), (3) connected granules (granules connected by a fiber(s) counted as two long fibers) and (4) granules too complex to calculate (granules that are so misshapen that the shape analyzer would not enter them).

The equation used to determine the total fiber count was:

$$\frac{\text{short fibers} + \text{long fibers} \; [= \text{long fibers} + (2 \times \text{connected granules})] + \text{granules too complex to calculate}}{\text{total fiber count}}$$

As shown below in Table 4, use of the rolling device decreased the total amount of protruding fibers by about two-thirds. The standard deviations also decreased when the rolling device was used, thereby indicating a reduction in the variability of the granules.

TABLE 4

| | FIBERCOUNT | | | | | |
|---|---|---|---|---|---|---|
| | 12/20 Normal Mode | 12/20 Roller Mode | 16/30 Normal Mode | 16/30 Roller Mode | 20/40 Normal Mode | 20/40 Roller Mode |
| Percent Total Fibers | | | | | | |
| Mean | 47.6% | 16.6% | 36.8% | 12.9% | 33.0% | 11.0% |
| STD Deviation | 11.1 | 8.2 | 13.5 | 7.0 | 13.6 | 6.5 |
| Range | 23.8–73.3 | 3.0–39.5 | 15.8–69.9 | 3.6–30.5 | 16.1–69.7 | 3.5–25.2 |
| Percent Long Fibers | | | | | | |
| Mean | 19.8% | 5.1% | 14.7% | 4.5% | 14.9% | 3.4% |
| STD Deviation | 5.7 | 4.2 | 7.2 | 4.1 | 6.8 | 2.4 |
| Range | 10.2–31.6 | 0.6–20.6 | 5.6–33.1 | 0.0–14.6 | 5.7–31.3 | 0.6–8.3 |
| Percent Short Fibers | | | | | | |
| Mean | 24.0% | 10.7% | 17.8% | 7.4% | 14.9% | 6.8% |
| STD Deviation | 6.1 | 5.1 | 6.9 | 3.8 | 5.9 | 4.3 |
| Range | 11.9–32.6 | 1.8–23.0 | 6.7–34.7 | 2.9–19:2 | 5.1–23.0 | 1.2–17.5 |
| Percent Connected Granules | | | | | | |
| Mean | 1.7% | 1.2% | 1.5% | 1.2% | 0.9% | 0.6% |
| STD Deviation | 1.9 | 1.4 | 1.8 | 2.3 | 1.1 | 0.9 |
| Range | 0.0–7.3 | 0.0–5.7 | 0.0–7.6 | 0.0–11.9 | 0.0–4.2 | 0.0–3.6 |
| Percent Too Complex To Calculate | | | | | | |
| Mean | 3.9% | 0.8% | 4.3% | 1.0% | 3.8% | 0.7% |
| STD Deviation | 2.2 | 0.8 | 3.4 | 0.9 | 2.8 | 0.9 |
| Range | 0.0–9.1 | 0.0–2.9 | 0.6–15.7 | 0.0–3.3 | 0.6–10.1 | 0.0–3.8 |

John Deere flowability tests were conducted on 50 pound samples from each mode of operation. The 50 pound samples were put into John Deere applicator hoppers and the flow rate of each hopper was calibrated. A one-minute sample was then taken from each hopper and subsequent samples were collected at 15-minute intervals over a two-hour and fifteen-minute period. As illustrated below in Table 5, the standard deviations were much lower when the rolling device is used, again indicating a reduction in the variability of the final product.

TABLE 5

JOHN DEERE FLOWABILITY

| | 12/20 NORMAL MODE | 12/20 ROLLER MODE |
|---|---|---|
| Mean Flowability From Day To Day | 171.5 | 161.45 |
| Standard Deviation From Day To Day | 30.23 | 10.57 |
| Coefficient Of Variation From Day To Day | 17.62 | 6.55 |
| Averaged CV From Within A Day | 7.50 | 1.96 |

| | 16/30 NORMAL MODE | 16/30 ROLLER MODE |
|---|---|---|
| Mean Flowability From Day To Day | 142.4 | 175.4 |
| Standard Deviation From Day To Day | 26.56 | 10.41 |
| Coefficient Of Variation From Day To Day | 18.66 | 5.94 |
| Averaged CV From Within A Day | 7.30 | 1.67 |

| | 20/40 NORMAL MODE | 20/40 ROLLER MODE |
|---|---|---|
| Mean Flowability From Day To Day | 69.9 | 79.3 |
| Standard Deviation From Day To Day | 12.49 | 7.03 |
| Coefficient Of Variation From Day To Day | 17.87 | 8.86 |
| Averaged CV From Within A Day | 5.62 | 2.39 |

The liquid holding capacities (LHCs) were obtained using the ASTM—Kerosene method. The LHCs were determined immediately after loading with kerosene. When the pilot plant operated without the rolling device, the granules had a LHC of 15% on a volume basis after one minute and 16% on a volume basis after 24 hours. However, when the rolling device was used, the granules had a minimum LHC of 18% on a volume basis after one minute.

While the present invention is described above in connection with preferred or illustrative embodiments, these embodiments are not intended to be exhaustive or limiting of the invention. Rather, the invention is intended to cover all alternatives, modifications, and equivalents included within its spirit and scope, as defined by the appended claims.

What is claimed is:

1. A method of producing improved cellulosic granules comprising the steps of:
   a) providing raw pulp or paper sludge;
   b) adjusting the moisture content of the raw sludge to allow fiber size reduction;
   c) reducing the fiber size of the sludge;
   d) agglomerating the sludge in an agitating device to cause cellulosic fibers to interlock and bond to form granules;

e) tumbling the granules in a rolling device which is separate from the agitating device while increasing the moisture level of the granules; and f) drying the granules.

2. The method of claim 1 wherein an alternate source of fiber is substituted for the raw pulp or paper sludge, said fiber being chosen from the group consisting of one or more of sugar beet, sugar cane, citrus pulp, grain, potato, peat moss and composted organic materials.

3. The method of claim 1 wherein in addition to the raw pulp or paper sludge, another source of fiber is used, said fiber being chosen from the group consisting of one or more of sugar beet, sugar cane, citrus pulp, grain, potato, peat moss and composted organic materials.

4. The method of claim 1 wherein step a) includes providing a quantity of raw pulp or paper sludge having about 40–90% fiber content by weight.

5. The method of claim 1 wherein dye is added.

6. The method of claim 1 wherein a fragrance is added.

7. The method of claim 1 wherein a biocide is added.

8. The method of claim 1 wherein an agricultural chemical is incorporated into the granules after drying.

9. The method of claim 1 wherein an agricultural chemical is incorporated into the granules before drying.

10. The method of claim 1 wherein the cellulosic fibers are agglomerated in a disk pelletizer.

11. The method of claim 1 wherein the cellulosic fibers are agglomerated in a pinmill.

12. The method of claim 1 wherein step c) includes reducing the fiber size to a range of about 1–10 mm in length.

13. The method of claim 1 wherein a filler chosen from the group consisting of kaolin clay, titanium dioxide, barytes and calcium carbonate is added.

14. The method of claim 1 wherein water is added to the rolling device at a rate sufficient to increase the moisture level of the granules by up to about 3%.

15. The method of claim 1 wherein the amount of water added to the rolling device increases the moisture level of the granules by approximately 1.5%.

16. The method of claim 1 wherein the rolling device operates at a speed in the range of about 90 to about 250 ft/min.

17. The method of claim 1 wherein the rolling device operates at a speed of about 188 ft/min.

18. The method of claim 1 wherein the granules are tumbled in the rolling device for about 1 to about 20 minutes.

19. The method of claim 1 wherein the granules are tumbled in the rolling device for about 15 to about 20 minutes.

20. The method of claim 1 wherein the rolling device is positioned at an angle of about 1° to about 5°.

21. The method of claim 1 wherein the rolling device is positioned at an angle of about 1.5°.

* * * * *

UNITED STATES PATENT AND TRADEMARK OFFICE
CERTIFICATE OF CORRECTION

PATENT NO. : 5,770,138
DATED : June 23, 1998
INVENTOR(S) : Rick L. Yoder

It is certified that error appears in the above-indentified patent and that said Letters Patent is hereby corrected as shown below:

Column 10, line 19, delete "20" and insert --60--.

Signed and Sealed this

Twenty-ninth Day of September, 1998

Attest:

BRUCE LEHMAN

Attesting Officer     Commissioner of Patents and Trademarks